(12) United States Patent
Stefina

(10) Patent No.: US 8,578,764 B2
(45) Date of Patent: Nov. 12, 2013

(54) SELF-RETAINING TARGET ASSEMBLY

(75) Inventor: Brian K. Stefina, Waterford, MI (US)

(73) Assignee: BorgWarner Inc., Auburn Hills, MI (US)

(*) Notice: Subject to any disclaimer, the term of this patent is extended or adjusted under 35 U.S.C. 154(b) by 284 days.

(21) Appl. No.: 13/125,983

(22) PCT Filed: Oct. 23, 2009

(86) PCT No.: PCT/US2009/061758
§ 371 (c)(1),
(2), (4) Date: Apr. 26, 2011

(87) PCT Pub. No.: WO2010/056481
PCT Pub. Date: May 20, 2010

(65) Prior Publication Data
US 2011/0203361 A1     Aug. 25, 2011

Related U.S. Application Data

(60) Provisional application No. 61/197,775, filed on Oct. 30, 2008.

(51) Int. Cl.
*G01M 13/02* (2006.01)

(52) U.S. Cl.
USPC ..................................................... 73/115.02

(58) Field of Classification Search
USPC ...................................................... 73/115.02
See application file for complete search history.

(56) References Cited

U.S. PATENT DOCUMENTS

| | | | | |
|---|---|---|---|---|
| 5,827,029 | A * | 10/1998 | Denman | 411/373 |
| 6,642,710 | B2 * | 11/2003 | Morrison et al. | 324/207.12 |
| 7,073,407 | B2 | 7/2006 | Stefina | |
| 2002/0089326 | A1 * | 7/2002 | Morrison et al. | 324/207.12 |
| 2003/0029692 | A1 * | 2/2003 | Rogner et al. | 192/85 CA |
| 2004/0238313 | A1 * | 12/2004 | Rogner et al. | 192/85 CA |
| 2005/0059858 | A1 | 3/2005 | Frith et al. | |
| 2006/0009326 | A1 | 1/2006 | Stefina | |
| 2006/0084318 | A1 * | 4/2006 | Si et al. | 439/564 |
| 2006/0087316 | A1 | 4/2006 | Islam et al. | |

FOREIGN PATENT DOCUMENTS

EP     1310210 A2     5/2003

* cited by examiner

*Primary Examiner* — Freddie Kirkland, III
(74) *Attorney, Agent, or Firm* — Warn Partners P.C.

(57) ABSTRACT

A sensor target assembly is provided for a body having an axial bore. The sensor target assembly includes a polymeric alignment positioning cylinder for insertion into the bore. Target material is provided which is mounted to the alignment positioning cylinder. The alignment cylinder can optionally have annular barbs.

5 Claims, 10 Drawing Sheets

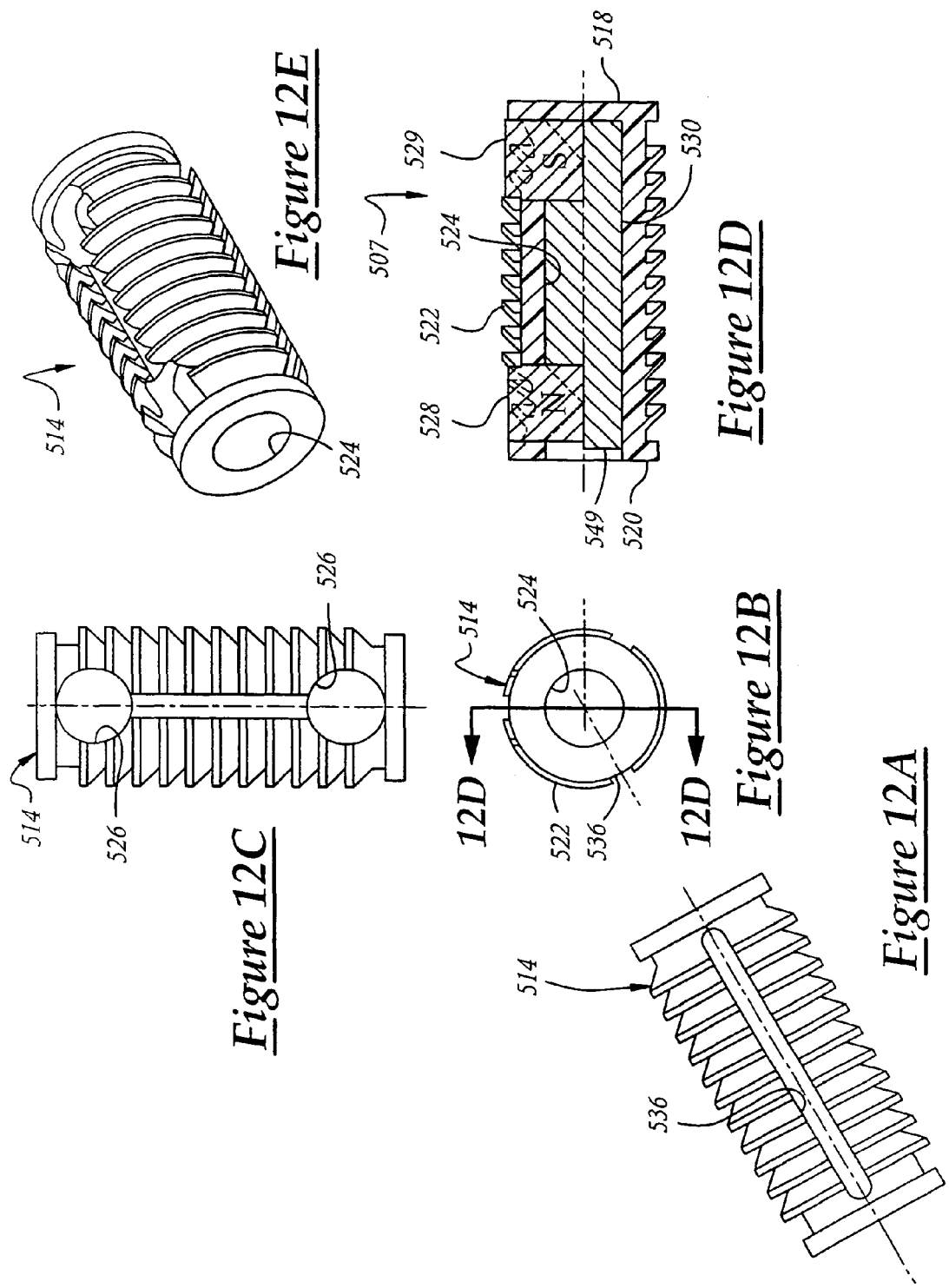

US 8,578,764 B2

SELF-RETAINING TARGET ASSEMBLY

FIELD OF THE INVENTION

The present invention relates to a target assembly for a sensor assembly highly useful in an integrated control module for a dual clutch transmission. An example of an integrated control module is revealed in U.S. Pat. No. 7,073,407 to Stefina (hereinafter Stefina), the disclosure for which is incorporated by reference herein.

BACKGROUND OF THE INVENTION

Stefina, commonly assigned, provides an integrated shift actuator position sensor assembly that includes a valve body having an inlet in fluid communication with a source of pressurized hydraulic fluid, a plurality of outlets, and a plurality of internal hydraulic passages disposed therebetween. The valve body further includes a plurality of raised portions juxtaposed to each other with a plurality of shift actuator bores piston bores formed therein. A plurality of shift actuators are adapted to operatively move the synchronizers of said transmission to affect gear changes, and include a plurality of shift actuator pistons slidingly disposed within the shift actuator bores. A hydraulic control assembly is mounted to the valve body and is adapted to operatively control the pressurized hydraulic fluid from the inlet through the plurality of internal hydraulic passages to the plurality of outlets to control the operative hydraulic functions of the transmission. A transmission control assembly is mounted to the valve body in electrical communication with the hydraulic control assembly and with a higher level vehicle control system. The transmission control assembly is adapted to be operatively responsive to the higher level control system to provide the requisite signals to control the hydraulic control assembly. A sensor assembly is also included that has a plurality of detecting elements fixedly mounted to the raised portions of the valve body and a plurality of reference elements or target assemblies fixedly mounted to each of the plurality of actuator pistons such that the detecting elements can sense the movement of the actuator pistons within the actuator piston bores to determine the positions of the transmission synchronizers.

It is desirable that the target assembly be provided so that there is ease in assembly of the target assembly to the piston. The target assemblies are utilized in a hot environment and are exposed to hydraulic fluid which is typically a hostile environment for polymeric material. It is essential that the target assemblies remain in their installed position for the life of the vehicle. Vehicle life of the target assembly should be extremely long since it is typical to expect a vehicle's transmission useful life to exceed the vehicle's expected useful life.

SUMMARY OF THE INVENTION

The present invention provides a sensor target assembly for a body such as a piston which has an axial bore. The senor target assembly includes a polymeric aligning positioning cylinder which is insertable into the piston bore. Target material, which is utilized by a sensor assembly, is mounted within the alignment positioning cylinder.

Other objects, features, and advantages of the present invention will be readily appreciated, as the same becomes better understood after reading the subsequent description taken in connection with the accompanying drawings.

BRIEF DESCRIPTION OF THE DRAWINGS

FIG. 12A is a side elevational view of a polymeric alignment cylinder utilized in an inventive sensor target assembly according to the present invention;

FIG. 12B is a front elevational view of the polymeric alignment cylinder shown in FIG. 12A;

FIG. 12C is a top plan view of the polymeric alignment cylinder shown in FIG. 12A;

FIG. 12D is a side sectional view of the polymeric alignment cylinder shown in FIG. 12A with magnetic targets and a flux bar shown in phantom installed therein;

FIG. 12E is a perspective view of the polymeric alignment cylinder shown in FIG. 12A;

DETAILED DESCRIPTION OF THE PREFERRED EMBODIMENT

Figure 1A:
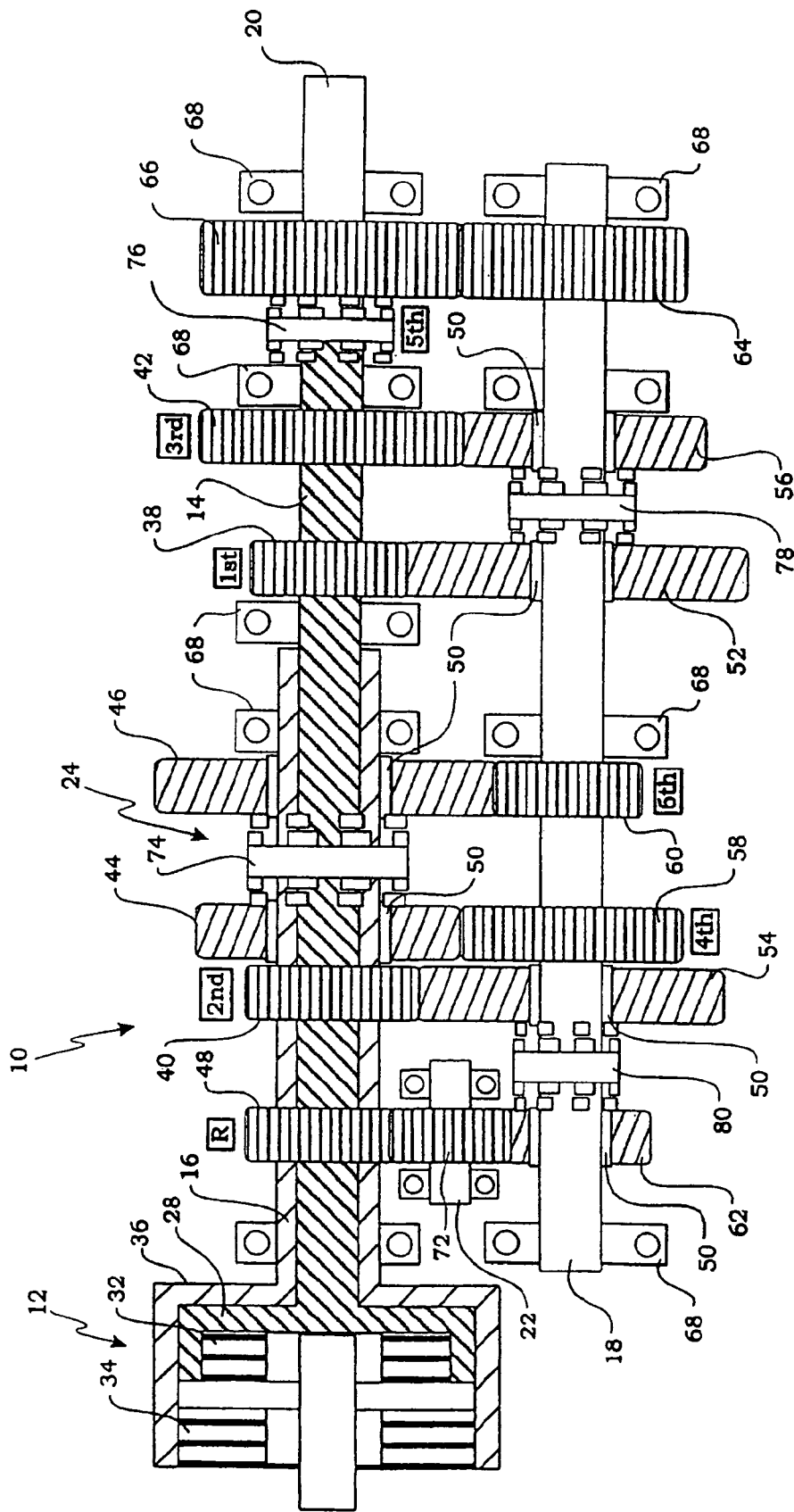
FIG. 1A is a generalized schematic illustration of a dual clutch transmission that can be employed with a sensor assembly utilizing an inventive sensor target assembly according to the present invention.
Figure 1B:
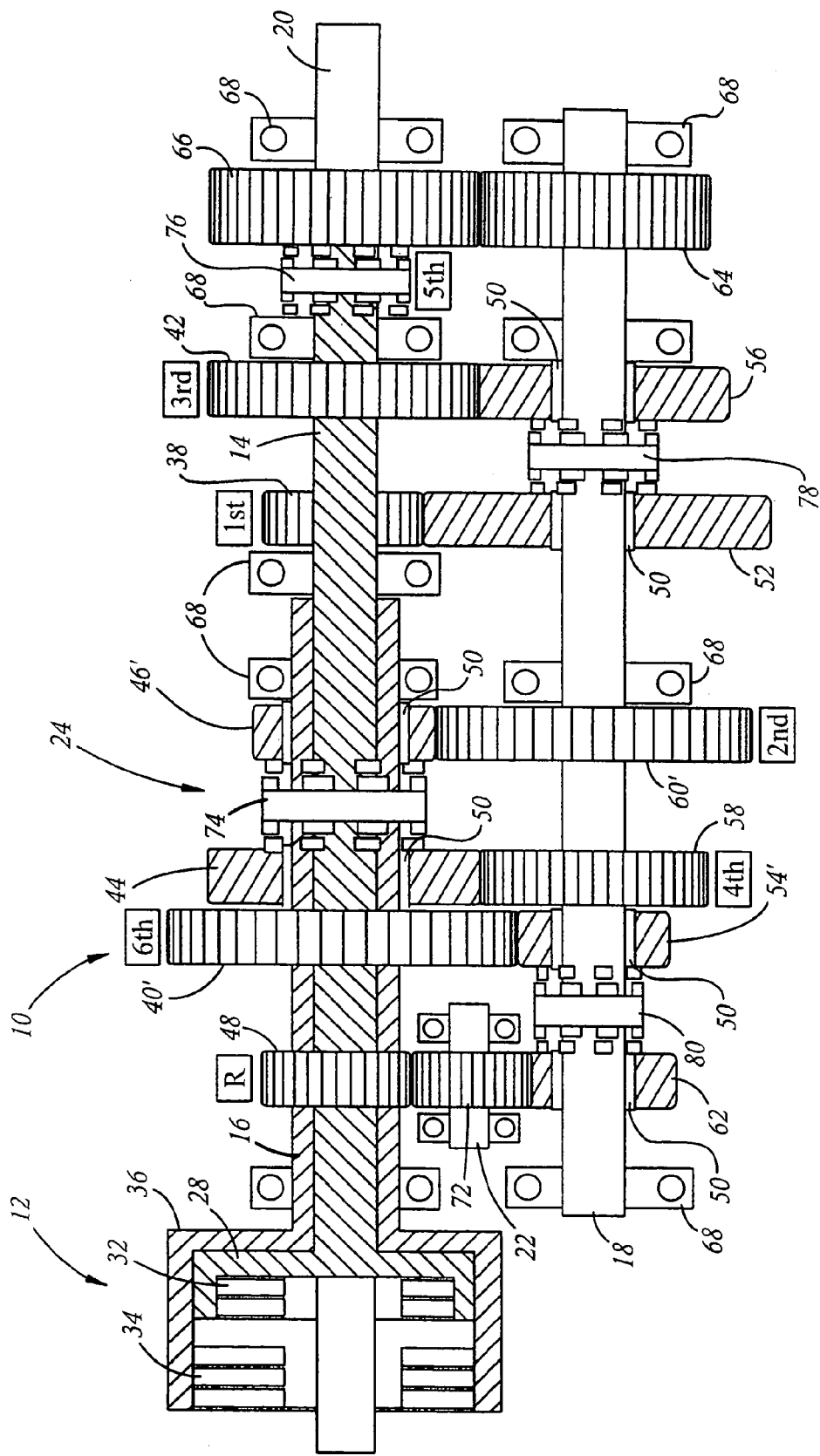
FIG. 1B. is a generalized schematic illustration of another dual clutch transmission which has a sensor assembly which can utilize a sensor target assembly according to the present invention.

A representative dual clutch transmission that has a control system utilizing a sensor assembly according to the present invention is generally indicated at 10 in the schematic illustrated in FIG. 1. Specifically, as shown in FIG. 1A, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24.

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by a plurality of shift actuators 26 (discussed in reference to FIG. 2 below) to selectively engage the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1A, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. It should be appreciated that, although not illustrated herein, the first and second clutch mechanisms 32, 34 and the first and second input shafts 14, 16 may be physically arranged within the transmission in a parallel, rather than co-centric structure.

The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

Another representative dual clutch transmission 101 that can be controlled by a control system utilizing a sensor assembly by Stefina is shown and described in Buchanan et al., PCT/US2008/002687, commonly assigned, the disclosure of which is incorporated by reference herein. In Buchanan et al., the positions of the second gear 60' and the sixth gear 40' (and their respective counter gears 46', 54') are switched with each other from the position shown in FIG. 1A to the positions shown in FIG. 1B.

Referring back to FIG. 1A, the counter shaft 18 is a single, one-piece shaft that includes the opposing, or counter, gears to those on the inputs shafts 14, 16. As shown in FIG. 1A, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1A.

The engagement and disengagement of the various forward and reverse gears is accomplished by the actuation of the synchronizers 24 within the transmission. As shown in FIG. 1A in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to the example illustrated in FIG. 1A, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible.

It should be further appreciated that the general operation of the dual clutch transmission 10 may be managed by some type of higher-level control device such as an electronic control unit (ECU) that oversees the functioning of the operation of the vehicle. As will be discussed below, the particular functions of the transmission itself are controlled by a transmission control assembly (88 in FIGS. 4 and 5) that may be responsive to the overall control of the higher-level control device. It should be further appreciated that the transmission may also be designed to take direct inputs from a variety of sources to control the functions of the transmission directly such that a cooperative interaction with other vehicle control devices is employed rather than a management subordination scheme under a higher-level control device.

The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and it is determined that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches.

Figure 2:
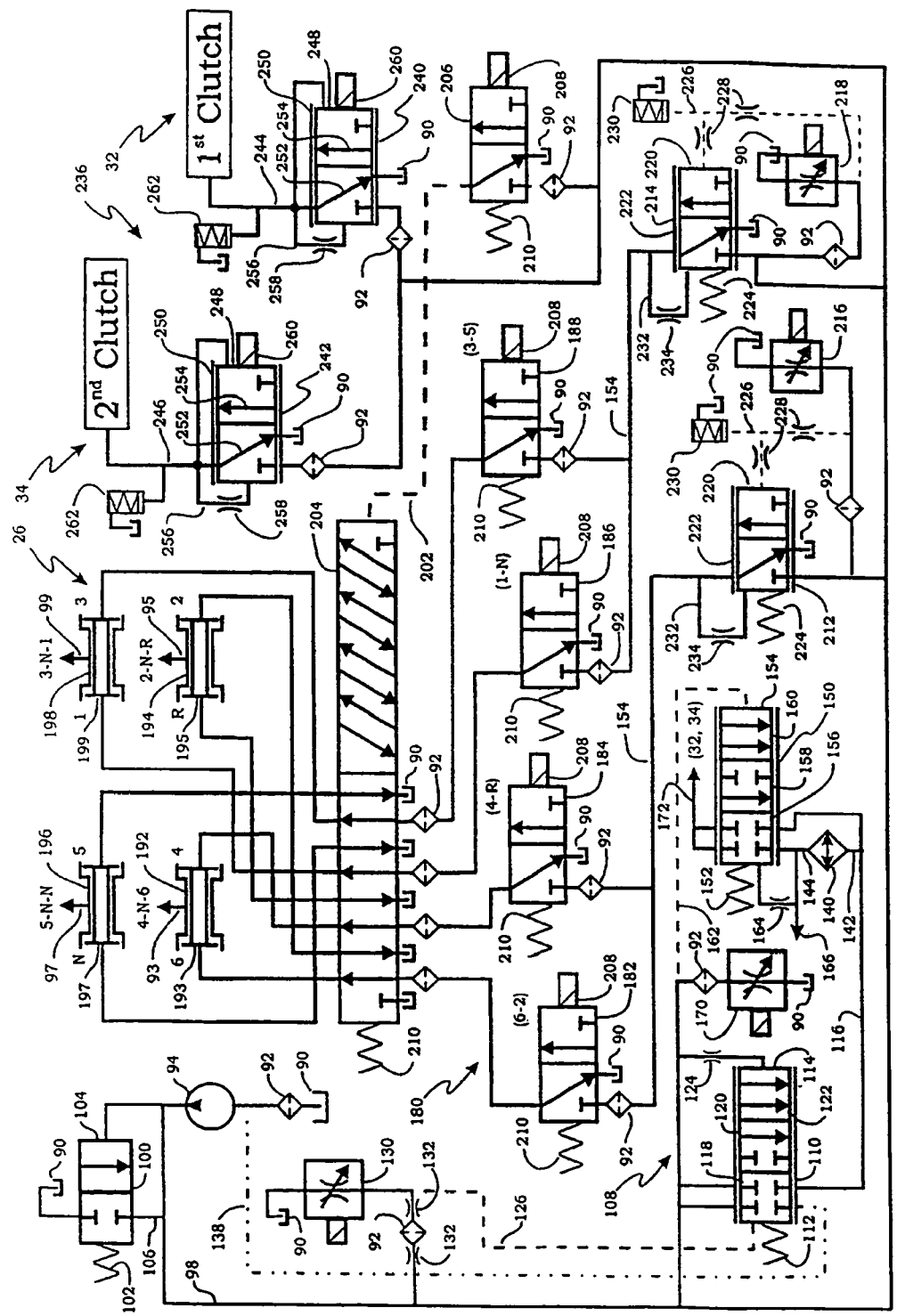
FIG. 2 is a schematic illustration of the electro-hydraulic control circuit that may be employed with a dual clutch transmission of the type illustrated in FIG. 1.

Thus, it can be readily seen that a number of control assemblies or systems must be in place to control the operation of the dual clutch transmission. Furthermore, since the clutch mechanisms, gear sets, and other mechanical portions of the transmission are cooled and lubricated by the hydraulic fluid contained within the transmission, there must be a control assembly or system for these purposes as well. As an example, FIG. 2 schematically illustrates a typical electro-hydraulic circuit, which has the requisite control assemblies and systems that may be employed with the dual clutch transmission 10 described above.

To produce a flow of pressurized hydraulic fluid, which is used as the hydraulic actuation and motive force for the transmission control assemblies and systems, and which is also used as the lubrication and cooling media within the transmission, a transmission pump and associated regulating circuit are required. As shown in FIG. 2, this example of a dual clutch transmission hydraulic circuit is of a wet-sump type, meaning that the bulk of the hydraulic fluid is maintained in and drawn from a pan or sump 90. The sump symbol is used with the various hydraulic circuits illustrated in FIG. 2 to indicate that a return path from the particular portion of the circuit is provided back to the sump 90. A pump 94 is used to provide positive pressure to the cooling fluid as it is drawn from the sump 90 through a filter 92. The filter symbol is also used throughout FIG. 2 to indicate that the particular hydraulic path includes a like filtering device. It should be appreciated that the filter 92 may be one singular filter, or a plurality of individual filters for each path, or some combination of both.

The pump output charges a main pressure line 98 that feeds the various components and hydraulic circuits throughout the transmission 10. This pressure output from the pump 94 is typically referred to as "line" pressure. A pump pressure relief valve 100 is operatively connected in fluid communication with the main pressure line 98 to provide a maximum upper limit for the positive pressure provided by the pump 94. The pressure relief valve 100 is moved to its closed position, as shown in FIG. 2, by a biasing member 102. The biasing member 102 has a pre-determined spring force that corresponds to the desired maximum system pressure. In the advent that the pressure in the main pressure line 98 exceeds the pre-determined maximum, the excessive pressure, as applied to the right side of the valve, will move the valve member 104 of the pressure relief valve 100 to the left, overcoming the spring force of biasing member 102. In this manner, the previously blocked relief passage 106 is opened to the sump 90 allowing the excessive pressure to bleed off and dropping the pressure in the main pressure line 98 until the biasing member 102 can force the valve member 104 of the relief valve 100 back to its closed position. Thus, the pump 94 provides "line" pressure to a maximum value as set by the operation of the relief valve 100.

One of the operative systems that the main pressure line 98 feeds is the clutch cooling fluid control assembly generally indicated at 108. It should be appreciated that the cooling fluid control assembly 108 may be structured in a variety of ways. However, for the purpose of this example, the dual clutch transmission 10 shown herein employs a clutch cooling pressure regulator 110, a line pressure VBS (variable bleed solenoid) 130, a cooling unit 140, a clutch cooling flow regulator 150, and a cooling fluid VBS 170. The clutch cooling pressure regulator 110 maintains the pressure supplied from the main pressure line 98 at a pre-determined operating pressure, or setpoint. The clutch cooling pressure regulator 110 is shown in FIG. 2 in its closed position and includes a biasing member 112 and a main valve member 114. The main valve member 114 has internal flow passages, which are separated into left 118, middle 120, and right 122 portions as illustrated in this figure.

The hydraulic pressure and flow in the main pressure line 98 is supplied to the right side of the valve member 114 through a flow restrictor 124 that reduces the flow volume but maintains the applied pressure. With the pump 94 operating, the pressure delivered to the right side of the valve member 114 overcomes the spring force of the biasing member 112 and moves the valve member 114 to the right from the closed left position 118 to the middle operable position 120. Here, the internal flow passages of the middle operable position 120 allow the flow of cooling fluid from the main pressure line 98 to flow into the regulated line 116. A regulating control line 126, shown as a dotted line, provides a controllable biasing force to the left side of the clutch cooling fluid regulator 110. The regulating control line 126 delivers a portion of the pressure from the main pressure line 98 to the left side of the regulator 110 under the control of the line pressure VBS 130.

The line pressure VBS 130 is electrically operated by the transmission control assembly 88 (FIG. 3) and supplies a varying portion of the available line pressure through the regulating line 126 to the clutch cooling pressure regulator 110 by bleeding off some portion of the line pressure as supplied through flow restrictors 132 and filter 92 to the sump 90. In this manner, the line pressure VBS 130 selectively and operatively sets the desired cooling fluid pressure setpoint for the clutch cooling pressure regulator 110. The line pressure VBS 130 varies the pressure in the regulating line 126 to maintain the cooling fluid output pressure delivered from the clutch cooling pressure regulator 110 about the desired output pressure setpoint while accounting for fluctuations in the output pressure due to downstream pressure changes.

The clutch cooling pressure regulator 110 also provides control over rapid increases, or surges, in the main pressure line 98 that exceeds the immediate correction ability of the line pressure VBS 130. The right valve position 122 of the valve member 114 opens an additional flow passage that not only allows for the continued flow of fluid through the pressure regulator 110 to the regulated line 116, but also allow a portion of the increased flow to pass to the suction line 138. The suction line 138 normally remains closed off by the left and middle valve portions 118, 120 respectively of the valve member 114. However, when a sharp or rapid increase of pressure in the main pressure line 98 drives the valve member 114 all the way to the left, a corrective portion of the flow is fed back to the suction side of the pump 94. As the suction line 138 bleeds off the surge of excessive pressure flow, the regulator valve member 114 moves back to the middle operative valve position 120.

The regulated hydraulic flow from line 116 out of the clutch cooling pressure regulator 110 feeds the cooling unit 140 and the clutch cooling flow regulator 150. The cooling unit 140 may be of any type of fluid cooler designed to dissipate heat and reduce the temperature of the fluid returned to the sump. The cooling unit 140 may include, but is not limited to, a heat exchanger of the fluid-to-air type as is commonly known in the art. It should be appreciated that if the cooling unit 140 is of a fluid-to-air type it will be mounted outside of the transmission case with hydraulic lines 142 and 144 providing the appropriate routing. The clutch cooling pressure regulator 110 and the clutch cooling flow regulator 150 are substantially similar. The clutch cooling flow regulator 150 includes a biasing member 152 and a main valve member 154. The main valve member 154 has internal flow passages, which are separated into left 156, middle 158, and right 160 valve portions (as illustrated).

The regulator control line 162 (shown as a dotted line) provides an actuating force to the right side of the clutch cooling flow regulator 150. The regulator control line 162 delivers a portion of the pressure from the main pressure line 98 under the control of the cooling fluid VBS 170 to the right side of the valve member 154. The cooling fluid VBS 170 is electrically operated by the transmission control assembly 88 (FIG. 3) to control the delivery of cooling fluid to the clutches 32, 34 through the cooing fluid supply line 172 by regulating the cooling fluid flow through the clutch cooling flow regulator 150. The cooling fluid VBS 170 supplies a variable portion of the available line pressure through the regulator control line 162 to the right side of the clutch cooling flow regulator 150 by operatively bleeding off some portion of the line pressure applied to the right side of the valve member 154 to the sump 90. The pressure supplied to the right side of the clutch cooling flow regulator 150 moves the valve member 154 to the left. Under clutch low load or low stress conditions, the cooling fluid VBS 170 causes the clutch cooling flow regulator 150 to provide a regulated supply of pressurized cooling fluid from the cooling unit 140 as the primary cooling source through the middle valve section 158 of valve member 154. Under clutch high stress or heavy load conditions, the cooling fluid VBS 170 causes the clutch cooling flow regulator 150 to provide a regulated supply of cooling fluid from the cooling unit 140 as the primary cooing source and additionally provide cooling fluid directly from the pump 94 through the right valve section 160. The determination of when the cooling fluid VBS 170 causes the clutch cooling flow regulator 150 to provide pressurized cooling fluid from either the middle or right valve section 158, 160 of the valve member 154 is predetermined and under the control of the transmission control assembly.

A biasing pressure taken from the output line 144 of the cooling unit 140 is applied to the left side of the valve member 154 through a restrictor 164 to supplement the biasing force of the biasing member 152. This assists the biasing member 152 in returning the valve member 154 to the closed position when the applied controlling pressure through the regulator control line 162 is removed or drops. It should be noted that line 144 from the cooling unit 140 also provides a portion of the pressurized fluid to other parts of the dual clutch transmission 10 for lubrication or other needs, as indicated by 166. It should be appreciated that other routing arrangements for the cooling unit 140 may also be employed. For example, the input pressure to the cooling unit 140 may be separately regulated from the line pressure, or the input pressure to the clutch cooling flow regulator 150 may be uncontrolled line pressure.

Depending on the physical structure and particular operative design considerations of the dual clutch transmission, the hydraulic circuit employed to control and support it may also include a second clutch cooling fluid regulator and a second control actuator. Generally speaking, only a single cooling fluid supply is provided to a co-centric dual clutch arrangement as discussed with reference to FIG. 1A. However, if a dual clutch transmission having a parallel clutch arrangement is employed, two separate clutch cooling flow regulators may be used to separately control the flow of cooling fluid.

With continuing reference to FIG. 2, to control the operation of the synchronizers 24 (FIG. 1A) and operatively shift the gear sets in and out of engagement, hydraulic shift actuators generally indicated at 26 are employed to either move the synchronizers left or right into gear engagements or to neutralize (center) the synchronizers 24. The application of hydraulic pressure to the shift actuators 26 is operatively controlled by actuator solenoid valves, generally indicated at 180. In FIG. 2, the shift actuators 26 are illustrated in the neutral position and the actuator solenoid valves 180 are illustrated in the de-energized position. Shift forks are schematically illustrated and generally indicated at 96. Specifically, they are shown as arrows 93, 95, 97, and 99 extending from the shift actuators 26. The shift forks 96 will be discussed in greater detail below. For clarity, the synchronizers 24 are not illustrated in FIG. 2. Each of the shift actuators 26 is a dual hydraulic assembly operatively moving a two-sided synchronizer 24 to engage their respective gear sets.

As shown in FIG. 2 with respect to the example of a dual clutch transmission 10 of FIG. 1, there are four actuator solenoid valves 182, 184, 186, and 188 that control the four shift actuators 192, 194, 196, and 198. As will be discussed below, the shift actuators further include slidable actuator pistons 193, 195, 197, and 199 respectively, which operatively move (left or right, as illustrated) to cause the shift forks 96, and thereby the synchronizers 24 to move in a like manner. Thus, the actuator solenoid valves 180 must provide pressure to both sides of each shift actuator 26 to cause the shift actuators 26 to selectively move and engage the synchronizers 24 to a specific gear set. To this end, the actuator solenoid valves 180 are also multiplexed (i.e., used for more than one operation) through the use of a multiplex valve 204. The multiplex valve 204 is controlled by a multiplex solenoid valve 206. The multiplex valve 204 is illustrated in its deactivated position, but when the multiplex solenoid valve 206 applies hydraulic pressure through line 202 to activate the multiplex valve 204, the multiplex valve 204 moves to the left (as illustrated in FIG. 2) to its activated position. Through the use of the multiplex valve 204, each actuator solenoid 180 provides the hydraulic pressure for two shift movements. The actuator solenoid valves 180 and the multiplex solenoid valve 206 are electrically controlled by the transmission control assembly 88 (FIG. 3) through the application and interruption of a voltage to the coil assemblies 208 of the individual solenoids. The actuator solenoid valves 180 and the multiplex solenoid valve 206 have biasing members 210 that return them to their normally closed position when de-energized, as shown in FIG. 2.

To operate the actuator solenoid valves 180 in the example illustrated in FIG. 2, the following events must occur. When it first gear is to be engaged, there is a direct path from the actuator solenoid 186 through the multiplex valve 204 to allow actuator solenoid 186 to pressurize the left side of shift actuator 198. Then energizing actuator solenoid 198 to pressurize the left side of shift actuator 198 causes it to move the appropriate shift fork 96 and synchronizer 24 to the right (as illustrated) into first gear engagement. When engaging second gear, the multiplex solenoid valve 206 must be energized first to allow the multiplex valve 204 to move to the left to open a hydraulic path for actuator solenoid 182 to pressurize the right side of shift actuator 194 causing shift actuator 194 to move to the left so that the shifter fork 95 moves the appropriate synchronizer into second gear engagement. If the vehicle continues to accelerate, once the shift to second is completed, first gear will be disengaged and neutralized. To disengage first gear, the multiplex valve 204 is de-energized so that actuator solenoid 188 can pressurize the right side of shift actuator 198. Pressurizing the right side of shift actuator 198 will cause it to move to the left so that the shifter fork 99 moves the synchronizer out of first gear engagement to the neutral position. It should be appreciated that the disengagement of the synchronizers 24 and thus the neutralization of an engaged gear set is accomplished by actuating the opposing side of the respective shift actuator 26. This opposing, neutralizing actuation of the shift actuator 26 is only to the point of moving the shift fork 96 and respective synchronizer to the neutral and disengaged position without continuing the actuation to a full engagement of the opposing gear set. However, it should be further appreciated that this action is often required and in this particular example, due to the structure of the dual clutch transmission and hydraulic control circuit, the neutralizing action of first gear will be continued to move shift actuator 198 fully left into third gear engagement when necessary.

Therefore, in the representative example illustrated in FIG. 2, through the use of the multiplex valve 204, actuator solenoid 182 controls the shifts into either sixth or second gear, as well as the neutralization of fourth or reverse. Actuator solenoid 184 controls the shifts into fourth or reverse gear, as well as the neutralization of sixth or second. Actuator solenoid 186 controls the shifts into first gear, as well as the neutralization of third or fifth. Actuator solenoid 188 controls the shifts into third or fifth gear, as well as the neutralization of first. Since this representative example of a six-speed dual clutch transmission with reverse only requires seven shifting actions, actuator solenoid 188 only has to neutralize one gear set and actuator solenoid 186 only has to engage one gear set. It should be appreciated that the arrangement of the gear sets, the synchronizers, and the shift actuators within the dual clutch transmission may be application driven such that any relative arrangement of these components is possible as long as the even gear sets are on one axis (input shaft) and the odd gear sets are on the other axis (input shaft).

To accomplish the shift engagements, hydraulic pressure is provided to the actuator solenoid valves 180 by two actuator regulator valves 212 and 214. Actuator regulator valve 212 is controlled by actuator pressure VBS 216 and actuator regulator valve 214 is controlled by actuator pressure VBS 218. Each actuator regulator valve 212, 214 includes a valve member 220 slidingly disposed in a valve body 222. The actuator regulator valves 212 and 214 further include a bias spring 224 that causes the valve member 220 to be normally closed to the left as illustrated. The actuator pressure VBS 216, 218 supplies a variable portion of the available line pressure through the regulator control line 226 and restrictors 228 to the right side of the valve member 220 by operatively bleeding off some portion of the line pressure to the sump 90. Self-actuating return valves 230 are used in the regulator control lines 226 to act as dampers. The pressure supplied to the right side of the actuator regulator valves 212 and 214 from the actuator pressure VBS 216, 218 moves the valve members 230 to the left as illustrated. This causes the valves members 230 to open and regulate the line pressure and flow supplied to charge lines 154 of the actuator solenoids 182, 184, 186, and 188. The regulator valves 212, 214 have feed back lines 232 with restrictors 234 to assist the bias spring 224 in influencing the left side of the valve member 220.

In the aforementioned Buchanan et al. disclosure, the control circuit provides two multiplex valves instead of one multiplex valve 204 as shown in FIG. 2. However, the dual clutch transmission of Buchanan et al. can still be controlled by a controller utilizing a sensor according to the present invention.

As shown in FIG. 2, the first and second clutch mechanisms 32 and 34 of the dual coaxial clutch assembly 12 FIG. 1A are actuated by a clutch actuation control assembly generally indicated at 236. The clutch actuation control assembly 236 includes first and second clutch actuator solenoid valves, generally indicated at 240 and 242, respectively. The clutch actuator solenoid valves 240 and 242 are in fluid communication with, and supply hydraulic pressure to, the clutch mechanisms 32 and 34 through clutch pressure lines 244 and 246 respectively. Each of the clutch actuator solenoid valves 240 and 242 has a selectively movable valve member 248 disposed within a valve body 250 that has internal hydraulic flow passages 252 and 254. The clutch actuator solenoid valves 240 and 242 also have external hydraulic feedback passages 256, which feed both sides of the valve member 248 on differential areas. The feedback to the left side of the valve member has a restrictor 258 installed to dampen the closing bias force a predetermined amount. A solenoid 260 selectively drives the valve member 248 operatively from its de-energized position biased to the left as illustrated in FIG. 2 to its energized position which allows the flow of pressurized hydraulic fluid to flow through internal passages 254 out the clutch pressure line 244, 246 to the clutch 32, 34.

The clutch actuator solenoid valves 240 and 242 are current controlled, variable regulating valves such that a given control current applied to solenoids 260 will result in a particular pressure output in the clutch pressure lines 244, 246. The internal passages 252 of clutch actuator solenoid valves 240 and 242 send residual pressure from the clutch pressure lines 244 and 246 back to the sump 90 when the solenoid is de-energized. Additionally, return valves 262 are used as dampers.

Figure 3:
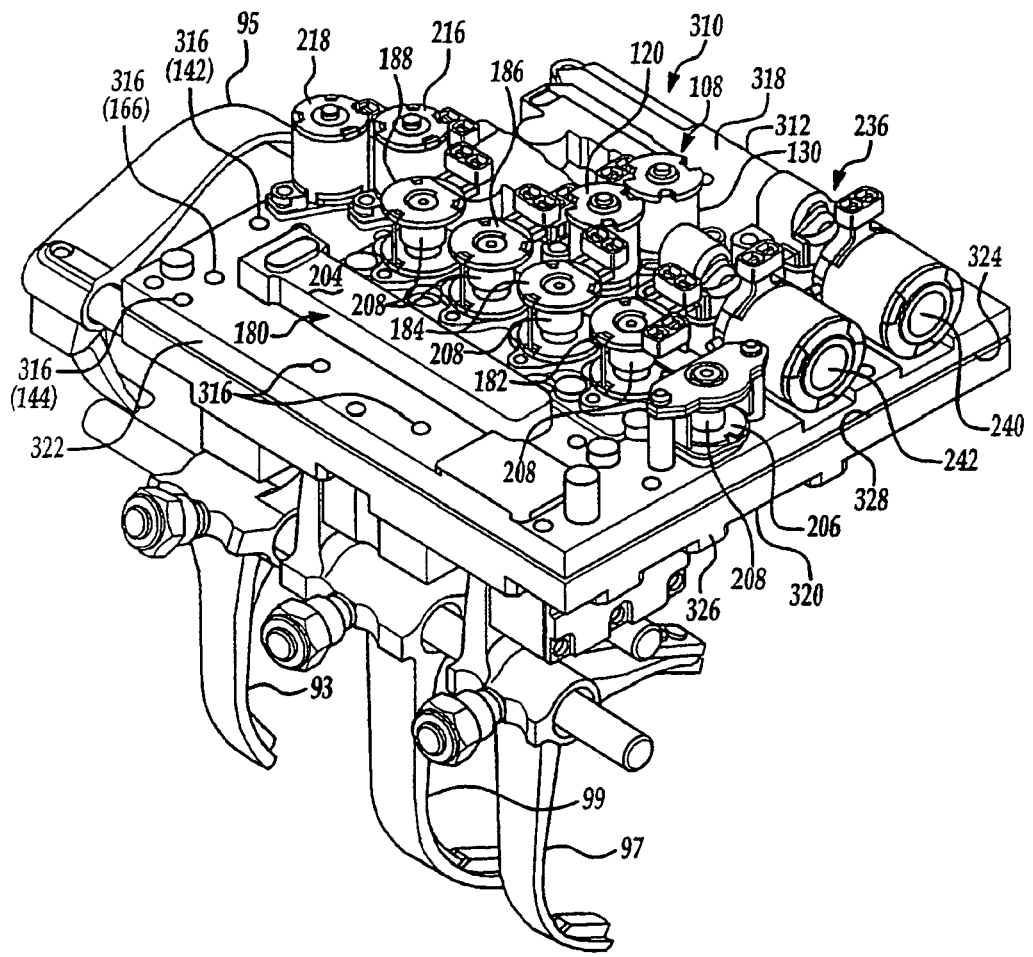
FIG. 3 is a perspective view of the module for operatively controlling the functions of a dual clutch transmission.
Figure 4:
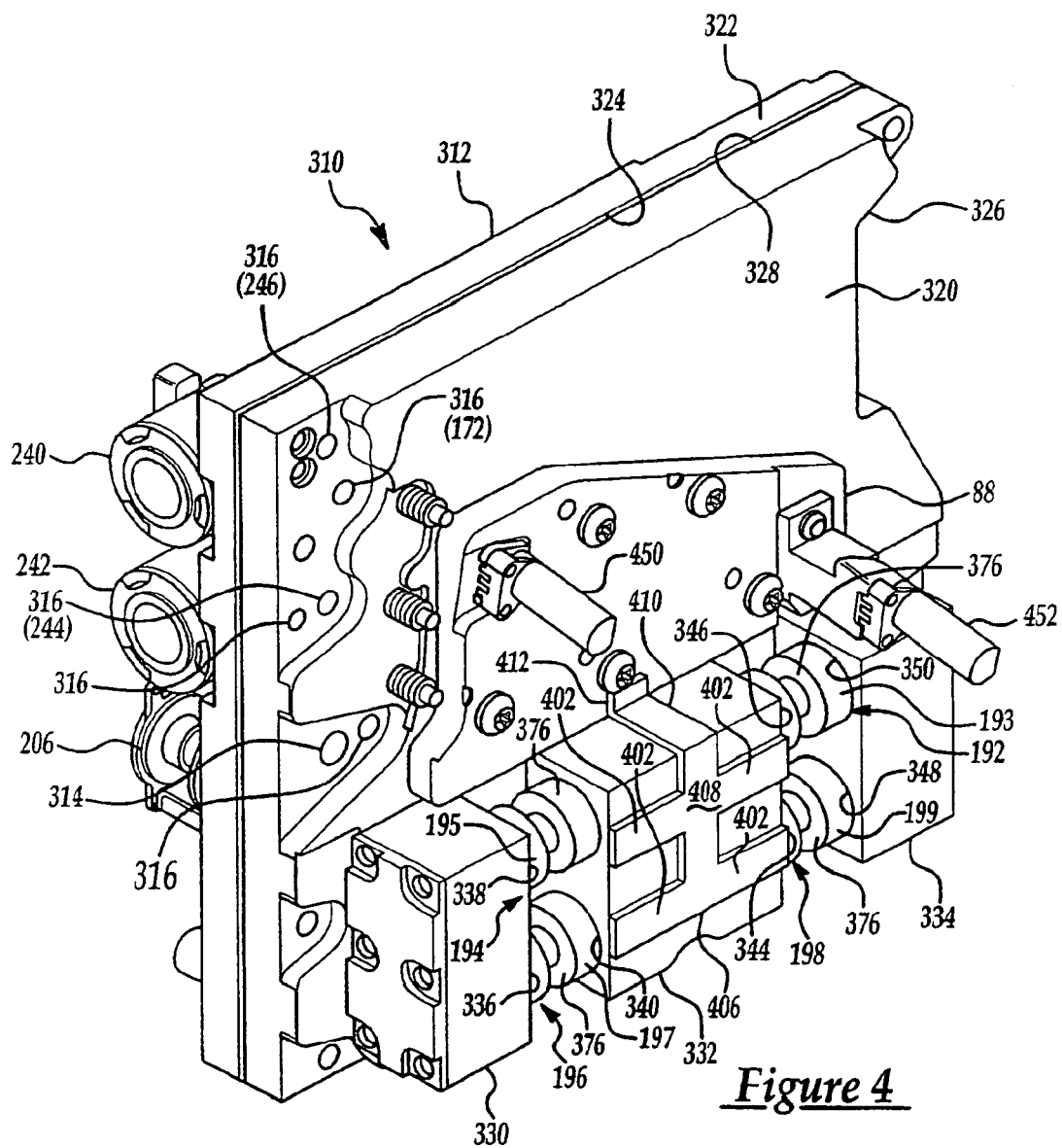
FIG. 4 is another perspective view of the module for operatively controlling the functions of a dual clutch transmission.
Figure 5:
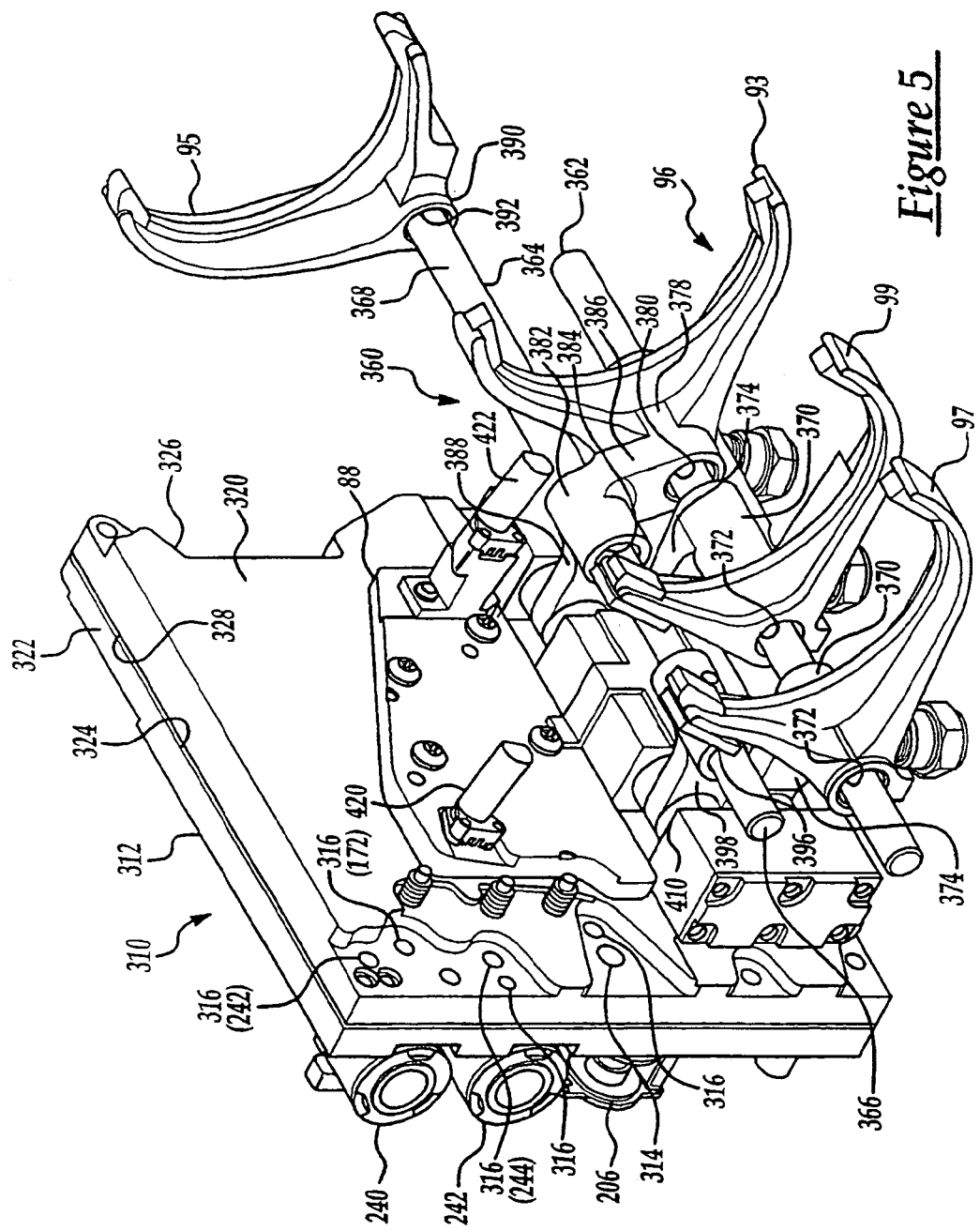
FIG. 5 is still another perspective view of the module for operatively controlling the functions of a dual clutch transmission.

As previously discussed, to date, these various electrically actuated, hydraulically-controlled, control and support systems for the dual clutch transmission have generally been separate, individual components physically spaced from one another requiring separate hydraulic lines and fittings to provide fluid communication. Shown in FIGS. 3 and 5 is an integrated control module for a dual clutch transmission that incorporates the necessary electrical and electro-hydraulic control and support elements together. The module is generally indicated at 310 in FIG. 3 where like numbers indicate like structure throughout the illustrations. The module 310 includes a valve body 312, having an inlet 314 (FIGS. 4 and 5) and a plurality of outlets 316 with a plurality of internal hydraulic passages disposed therebetween. The valve body 312 is generally rectangular in shape having a front face 318 and a rear face 320.

The inlet 314 is in fluid communication with a source of pressurized hydraulic fluid, such as the pump 94 which may be driven in some manner though a power take-off from the vehicle engine, or from an input to the transmission (not shown). More specifically, line pressure is delivered from the pump 94 (FIG. 2) and presented to the module 310 at its inlet 314 (FIGS. 4 and 5). The inlet 314 is a hydraulic continuation of the line pressure path 98 from the pump 94 through the various internal passages of the valve body 312. It should be appreciated that the pump pressure relief valve 100 (FIG. 2) may be incorporated on the valve body 312 or may simply be an inherent portion of the structure of the pump 94. In the preferred embodiment illustrated herein, the pressure relief valve 100 is incorporated in the pump 94 and the inlet 314 receives pressurized hydraulic fluid from line 98.

It should be further appreciated that the internal passages formed within the valve body 312 create the hydraulic lines or paths discussed above in reference to FIG. 2 and eliminate the need for separate hydraulic lines and fittings between the actuators, regulators, and control solenoids of the transmission. In this regard, the plurality of outlets 316 in the valve body 312 feed only a minimum number of outgoing hydraulic lines. The plurality of outlets 316 are connected to hydraulic lines 142, 144, 166, 172, 244, and 246 as shown in FIG. 2. More specifically, these hydraulic lines run to and from the cooling unit 140 (through lines 142, 144), to various lubrication points within the transmission (through line 166), to the clutches for cooling (through line 172), and to the clutches for engagement/disengagement (through lines 244, 246).

Furthermore, the valve body 312 is constructed of any of a variety of rigid materials capable of being formed to provide internal hydraulic passages, retain treaded fasteners, and withstand the environment within the case of a dual clutch transmission. In the preferred embodiment, the valve body 312 is formed of two halves. As illustrated in FIGS. 3 5, the front half 322 includes the front face 318 and an inner surface 324, and the rear half 326 includes the rear face 320 and an inner surface 328. It should be appreciated that the terms front and rear used herein in reference to the valve body 312 are relative only for the purposes of description and not indicative of their orientation when installed in the transmission. Thus, the internal passages are of the valve body 312 are formed on the inner surfaces 324 and 328 then the halves are joined and sealed together. In should be further appreciated that the valve body 312 may also by formed of a single monolithic piece and the internal passages formed in various manners such as boring and plugging.

Further, the valve body 312 is formed on its front face 318 to accept and receive any number of the requisite hydraulic control assemblies previously discussed with respect to FIG. 2 such that the hydraulic control assemblies are inserted into portions of the internal passages of the valve body 312. More specifically, the hydraulic control assemblies are mounted to the valve body 312 such their respective valve members (discussed above) communicate with and control portions of the hydraulic flow within the internal passages of the valve body 312. In other words, a hydraulic control assembly is mounted to the valve body 312 such that the hydraulic control assembly is adapted to operatively control the pressurized hydraulic fluid from the inlet 314 through the plurality of internal hydraulic passages to the plurality of outlets 316. The hydraulic control assemblies are retained to the valve body 312 by any manner of known fastening means such as threaded fasteners (not shown).

As discussed in regard to FIG. 2, the hydraulic control assembly that may be mounted to the valve body 312 includes at least one assembly from a group of assemblies that include: 1) a shift actuation control assembly 180 having a series of actuators 26 that are adapted to actuate the synchronizers 24 of the transmission, 2) a clutch actuation control assembly 236 having clutch actuators 240, 242 for each clutch 32, 34 that are adapted to allow the selective and independent engagement and disengagement of each clutch, and 3) a clutch cooling fluid control assembly 108 adapted to control the cooling fluid provided to the clutches of the transmission. Additionally, the module 310 may include any two of the above assemblies from the group. In the preferred embodiment, as will be discussed below; the present invention includes all three assemblies of the group.

A transmission control assembly 88 that is a sealed electronic control device, is mounted to the rear face 320 of the valve body 312 in electrical communication with the hydraulic control assembly, or assemblies, and with a higher level vehicle control system. The transmission control assembly 88 is adapted to be operatively responsive to the higher level control system to provide the requisite control signals to the hydraulic control assembly, or assemblies, to control the operative functions of the dual clutch transmission. It should be appreciated that a wiring harness is employed that electrically connects the transmission control assembly 88 with electrical connection points found on the various hydraulic control assemblies that are located on the front face 318 of the module 310 and which additionally provides electrical communication with other parts and components of the vehicle.

In regard to the hydraulic control assemblies and referring to FIG. 3, a shift actuation control assembly 180 includes the four actuator solenoid valves 182, 184, 186, and 188 that control the four shift actuators 192, 194, 196, and 198, the multiplex valve 204, and the multiplex solenoid valve 206. The four actuator solenoid valves 182, 184, 186, and 188 that control the shift actuators 26 are mounted in the front face 322 of the front half 322 of the valve body 312 in such a manner as to selectively direct the flow of hydraulic fluid through internal hydraulic passages and the multiplex valve 204 to operatively control the shift actuators 26. The solenoid coils 208 of each of the actuator solenoid valves is selectively activated by the transmission control assembly 88 as previously discussed to cause the shift actuators 26 to engage and disengage their respective gear sets.

The two actuator regulator valves 212 and 214 that supply and regulate the hydraulic pressure to the actuator solenoid valves, as previously discussed, are mounted within the front half 322 of the valve body 312, so that they are encapsulated by the front and rear halves 322 and 326 of the valve body when assembled. The actuator pressure VBS 216 and actuator pressure VBS 218 are mounted in the front face 318 of the front half 322 of the valve body 312 in such a manner as to selectively control the actuator regulator valves 212, 214 to direct the flow of hydraulic fluid through internal hydraulic passages to the actuator solenoid valves 182, 184, 186, and 188. The self-actuating return valves 230 used for damping the regulator control lines 226 are also mounted within the front half 322 of the valve body 312.

With continued reference to FIG. 3, the multiplex valve 204 is also mounted within the front half 322 of the valve body 312 similar to the actuator regulator valves 212, 214 so that it is encapsulated by the front and rear halves 322 and 326 of the valve body when assembled. The multiplex solenoid valve 206 is mounted into the front face 322 of the front half 322 of the valve body 312 in such a manner as to selectively direct the flow of hydraulic fluid through internal hydraulic passage 202 (FIG. 2) to operate the multiplex valve 206 when its solenoid coil 208 is activated by the transmission control assembly 88.

As best shown in FIG. 4, the four shift actuators 192, 194, 196, and 198 are incorporated into the rear face 320 of the valve body 312. The valve body is formed with a left 330, a center 332, and a right 334 raised portion, as illustrated. The raised portions 330, 332, and 334 of the valve body 312 include a plurality of actuator bores that accept and slidingly retain the actuator pistons 193, 195, 197, and 199 of the shift actuators. In this manner, the raised portions, their respective piston bores, and the actuator pistons comprise the shift actuators 192, 194, 196, and 198 as previously described. More precisely, the left raised portion 330 includes actuator piston bores 336 and 338, the center raised portion 332 includes actuator piston bores 340, 342, 344, and 346, and the right raised portion 334 includes actuator piston bores 348 and 350. The shift actuator 196 (FIG. 2) includes actuator piston bore 336 of the left raised portion in combination with the actuator piston bore 340 of the center raised portion that slidingly supports actuator piston 197. The shift actuator 194 (FIG. 2) includes actuator piston bore 338 of the left raised portion in combination with the actuator piston bore 342 of the center raised portion that slidingly supports actuator piston 195. The shift actuator 198 (FIG. 2) includes actuator piston bore 344 of the center raised portion in combination with the actuator piston bore 348 of the right raised portion that slidingly supports actuator piston 199. The shift actuator 192 (FIG. 2) includes actuator piston bore 346 of the center raised portion in combination with the actuator piston bore 350 of the left raised portion that slidingly supports actuator piston 193. The actuator piston bores are in fluid communication with the multiplexer valve 204 and their respective actuator solenoid valves 182, 184, 186, and 188 as previously discussed through internal passages within the valve body 312 to cause the actuator pistons to be operatively and selectively actuated to the right or to the left as required.

As best shown in FIG. 5, when the module 310 is mounted in the transmission case, the rear face 320 of the module 310 is oriented so that it faces the transmission input and output shafts (14, 16, 18, and 20 in FIG. 1) with the shifter forks 96 extending to engage the synchronizers 24. The example of the dual clutch transmission 10 discussed above further includes a shifter fork support assembly, generally indicated at 360. The shifter fork support assembly 360 includes two shifter fork rods 362 and 364 upon which the shifter forks are disposed. When assembled, shifter rod 362 is retained in the transmission case at both its ends. Shifter rod 364 has a proximate end 366 and a distal end 368, and is slidingly supported by its proximate end 366 in the transmission case (not shown). The shifter forks for shift actuators 192, 196, and 198 are slidingly disposed on shifter rod 362. Shifter forks 97 and 99 each include a support sleeve 370 that has a central bore 372 that slidingly support the shift forks on the rod 362.

Each of the actuator pistons 193, 195, 197, and 199 discussed above has an annular groove of decreased circumference 376 at a predetermined point along their length. In the preferred embodiment, the annular groove 376 is located at the midpoint along the length of the piston and is adapted to receive and retain a connection tab from a shifter fork so that each actuator piston is in mechanical communication with a synchronizer of the transmission. More specifically, a connecting tab 374 extends from each of the support sleeves 370 to engage the annular groove 376 (FIG. 4) of the respective actuator pistons 197 and 199 to allow the actuator pistons to move the shifter forks along the support rod 362.

Shifter fork 93 includes a first support sleeve 378 with a central bore 380 that is slidingly disposed on rod 362, and a second support sleeve 382 with a central bore 384 slidingly disposed upon rod 364. A support link 386 is fixedly disposed between the first and second support sleeves 378, 382. A connecting tab 388 extends from the second support sleeve 382 to engage a reduced diameter central portion 376 (FIG. 4) of the actuator piston 193 to allow the actuator piston to move the shifter fork along the support rods 362 and 364. Shifter fork 95 has a support sleeve 390 with a central bore 392 that is fixedly mounted to the distal end 368 of support rod 364. Support rod 364 further includes an engagement sleeve 394 with a central bore 396 that is fixedly mounted to support rod 364 near its proximate end 366. A connecting tab 398 extends from the engagement sleeve 394 to engage a reduced diameter central portion 376 (FIG. 4) of the actuator piston 195. In this manner, with the engagement sleeve 390 and shifter fork 95 fixed to the support rod 364, the actuator piston 195 moves the entire support rod 364 as it is slidingly supported by the second support sleeve 382 of shifter fork 93 and the transmission case at the proximate end 366. Thus, the module 310 controls the engagement and disengagement of the various gear sets of the transmission.

With continuing reference to FIG. 3, and as noted above, a clutch actuation control assembly 236 is provided having clutch actuators 240, 242 for each clutch 32, 34 that are adapted to allow the selective and independent engagement and disengagement of each clutch. The clutch actuators 240, 242 are mounted into the front face 322 of the front half 322 of the valve body 312 (FIG. 3) in such a manner as to control the line pressure from internal hydraulic line 98 to the individual clutches 32, 34, as described above. The self-actuating return valves 262 used for damping the output lines 244 and 246 to the clutches are mounted within the front half 322 of the valve body 312 so that they are encapsulated by the front and rear halves 322 and 326 of the valve body when assembled.

As discussed above, a clutch cooling fluid control assembly, generally indicated at 108 in FIG. 3, is adapted to control the cooling fluid provided to the clutches of the transmission. The clutch cooling pressure regulator 110 and clutch cooling flow regulator 150 are mounted within the front half 322 of the valve body 312 (not shown), so that they are encapsulated by the front and rear halves 322 and 326 of the valve body when assembled. The line pressure VBS 130 is mounted into the front face 322 of the front half 322 of the valve body 312 in such a manner as to selectively and operatively set the desired cooling fluid pressure setpoint for the clutch cooling pressure regulator 110. The cooling fluid VBS 170 is mounted in the front face 322 of the front half 322 of the valve body 312 in such a manner as to control the delivery of cooling fluid to the clutches 32, 34 through the cooing fluid supply line 172 by regulating the cooling fluid flow through the clutch cooling flow regulator 150.

Those having ordinary skill in the art will appreciate from the discussion above that the choice of mounting certain components within the front half 322 of the valve body 312 is a design consideration and that these components may be alternately mounted within the rear half 324 of the valve body 312. Additionally, some portion of these above-mentioned components may be mounted in the front half while others are mounted in the rear half. Furthermore, it is not strictly necessary that the joining of the halves provide a sealing encapsulation of these components within the module 310 if their operative control over the fluid communication within the internal hydraulic passages of the valve body 312 is otherwise formed. In other words, these components may also be physically mounted within either half 322 or 324 of the valve body 312 by any of a variety of known methods.

Figure 6:
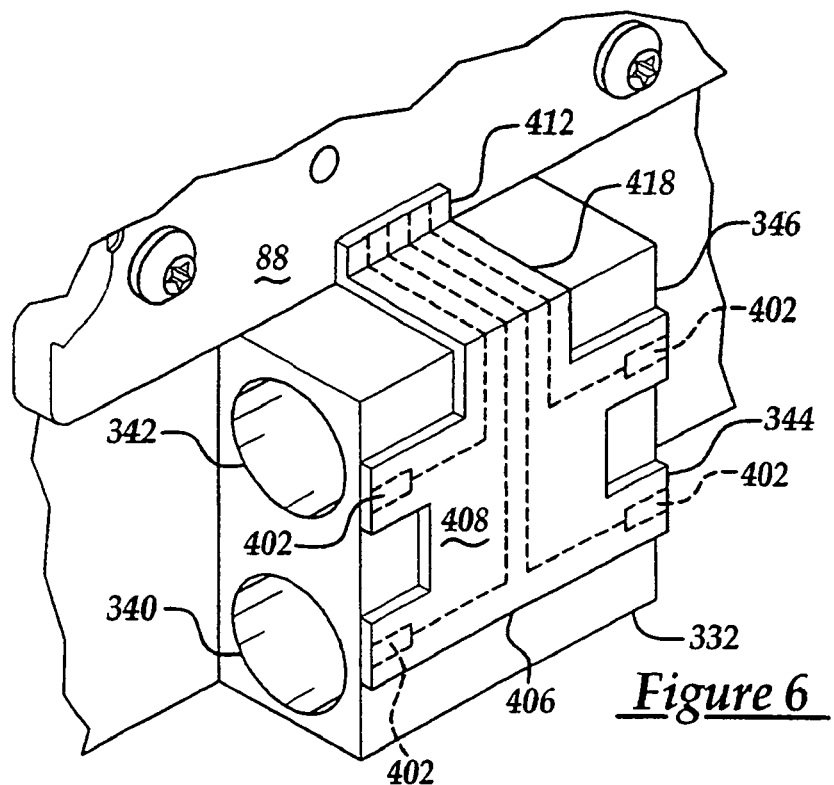
FIG. 6 is a perspective view of the central raised portion of the valve body including the detecting elements of the integrated sensor assembly.

The integrated shift actuator position sensor assembly of the integrated control module 310 is generally indicated at 400 in FIGS. 4 and 5. The components of the sensor assembly 400 are illustrated separately for clarity in FIGS. 6, 8A, and 8B. Other examples of alternate components that may be employed in the sensor assembly 400 are discussed below with reference to FIGS. 7, and 9A through 11B. The sensor assembly 400 includes a plurality of detecting elements, generally indicated at 402 in FIGS. 6 and 7, and a plurality of reference elements, generally indicated at 404 in FIGS. 8A and 8B. As shown in FIG. 6, in the preferred embodiment, the detecting elements 402 are mounted in a sensor carrier 406 that is fixedly mounted on the central raised portion 332 of the valve body 312. The sensor carrier 406 has a main portion 408 that covers the detecting elements 402 on the outer face of the central raised portion 332 and a leg 410 that extends over the side of the central raised portion 332 to the transmission control assembly 88. The appropriate wiring from the detecting elements 402 is routed through the main portion 408 and leg 410 of the sensor carrier 406 such that they are routed to a connection block 412, which provides electrical communication with the transmission control assembly 88.

Figure 7:
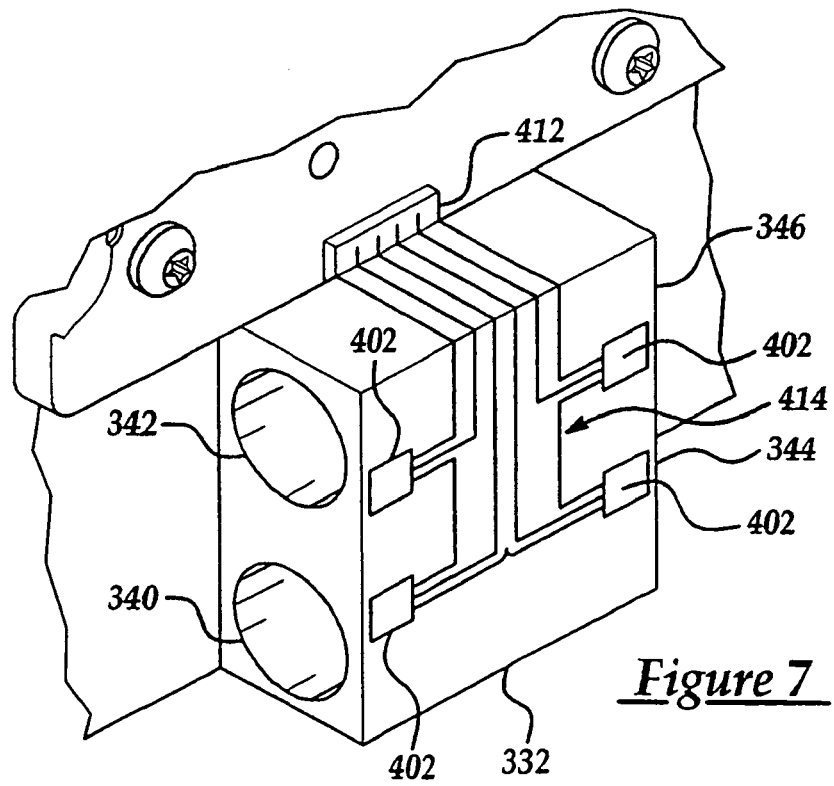
FIG. 7 is a perspective view of the central raised portion of a valve body including an alternate arrangement for the detecting elements of the integrated sensor assembly.

The detecting elements 402 are oriented on the central raised portion 332 of the valve body 312 so that they are near the ends of the shift actuator bores 340, 342, 344, and 346. It should be appreciated that the sensor carrier 406 may be formed of any of a variety of materials and may simply cover and protect the detecting elements 402 after they are separately fixed to the valve body 312, or the detecting elements 402 may be molded into the sensor carrier 406 before it is affixed to the valve body 312. Alternately, as shown in FIG. 7, the detecting elements 402 may be affixed to the central raised portion 332 of the valve body 312 without a sensor carrier and may be electrically connected to the connection block 412 by a flat wire arrangement generally indicated at 414. The detecting elements 402 may be any manner of electro-magnetically sensitive devices, such as hall-effect sensors or magneto-resistive sensors that are capable of detecting a change in magnetic field strength. In the preferred embodiment, the detecting elements 402 are hall-effect sensors.

Figure 8A:
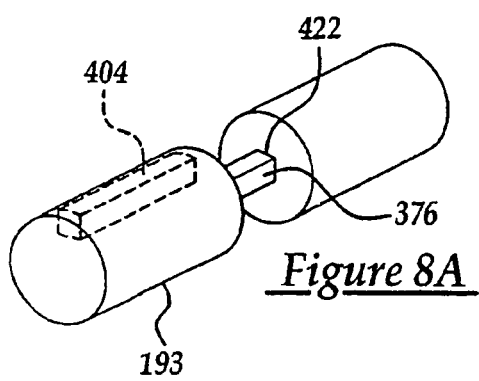
FIG. 8A is a perspective view of the one of the shift actuator pistons including one of the reference elements of the integrated sensor assembly.

A number of examples of the prior corresponding reference elements 404 are illustrated in FIGS. 8A through 11B. FIGS. 8A and 8B represent the preferred embodiment, in which a single bi-polar magnetic element is mounted in a longitudinal groove 420 formed on the shift actuator piston 193. In this case, the reference elements 404 are magnetic bars mounted longitudinally within each of the pairs of actuator pistons along the length of one of the pair of actuator pistons 193. Thus, one of the plurality of detecting elements mounted on the central raised portion senses the relative position of the reference element 404, thereby the relative position of the respective pair of actuator pistons and the relative position of the respective synchronizer can be determined. Reference element 404 is formed of any of a variety of known materials capable of accepting and maintaining a bi-polar magnetic charge. As shown in FIG. 8B, reference element 404 is disposed in a groove or channel 420 that approaches but does not extend to the ends of the respective half of shift actuator piston 193. It should be appreciated that it is only necessary to place a reference element 404 in the portion of the shift actuator piston that slidingly resides in the central raised portion 332 of valve body 312. As shown, the reference element 404 presents a north and a south pole at opposite ends of the half of the actuator piston 193. This allows the respective detecting element 402 mounted on said central raised portion to sense the relative position and lateral movement of the actuator piston 193 in the piston bore 346. In this way, the relative position of the respective synchronizer 24 can be determined.

Additionally, the shaft 376 of piston 193 shown in FIG. 8A includes an flat portion 422 that cooperates with the connecting tab 388 of shifter fork 93. In this manner, as shift actuator piston 193 operatively slides back and forth in the shift actuator piston bores 346 and 350, the piston, and thereby reference element 404, is prevented from rotating in the bore and is held in a constant lateral orientation to the detecting element 402 mounted on the central raised portion 332 of the valve body 312. It should be appreciated that the structure and relative operation of each of the other shift actuator pistons 195, 197, and 199 (not shown) is the same as described with respect to shift actuator piston 193. In this manner, the other detecting elements 402 mounted to the central raised portion 332 likewise detect the movement of the their respective transmission synchronizers as well.

Figure 9A:
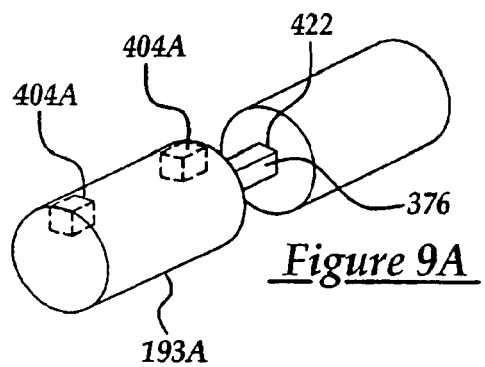
FIG. 9A is a perspective view of another embodiment of the one of the shift actuator pistons including one pair of the reference elements of the integrated sensor assembly.
Figure 9B:
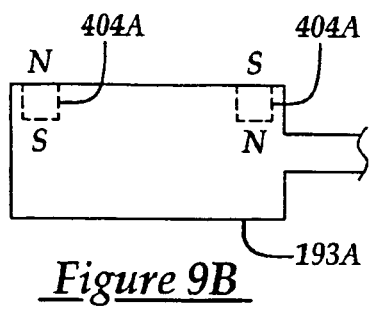
FIG. 9B is a partial cross-sectional view of the one of the shift actuator piston of FIG. 9A.

FIGS. 9A and 9B illustrate a similar approach to mounting a reference element in the piston. In this case, two separate smaller magnetic reference elements 404A are disposed at the ends of the one half of piston 193A that is slidingly disposed in actuator piston bore 346. As best shown in FIG. 9B, they are magnetic bars oriented in the actuator piston 193A in an opposite manner, such that with regard to the detecting element 402, one reference element 404A provides a north pole and the other reference element 404A provides a south pole. This allows the detecting element 402 to sense the lateral movement of the actuator piston 193A in the piston bore 346, which is directly indicative of the position the associated transmission synchronizer 24.

Figure 8B:
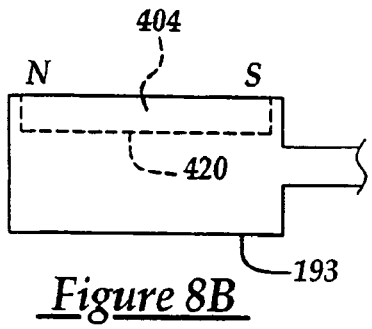
FIG. 8B is a partial cross-sectional view of the one of the shift actuator piston of FIG. 8A.

Similar to piston 193 illustrated in FIGS. 8A and 8B, the shaft 376 of piston 193A includes a flat portion so that the connecting tab 388 of the associated shifter fork will maintain a longitudinal orientation to the respective detecting element 402. It should be appreciated that the structure and relative operation of each of the other shift actuator pistons 195A, 197A, and 199A (not shown) is the same as described with respect to piston 193A. In this manner, the other detecting elements mounted to the central raised portion 332 likewise detect the movement of the their respective transmission synchronizers as well.

Figure 10A:
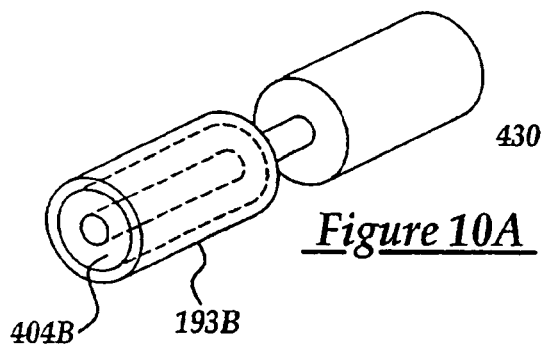
FIG. 10A is a perspective view of another shift actuator piston including one of the reference elements of the integrated sensor assembly.
Figure 10B:
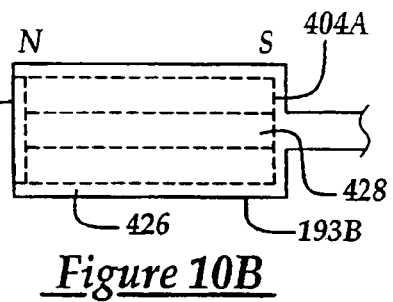
FIG. 10B is a partial cross-sectional view of the one of the shift actuator piston of FIG. 10A.

FIGS. 10A and 10B illustrate another approach to mounting a reference element in the piston 193B. As shown in the figures, the piston 193B includes a receiving bore 426 formed in one end of one of the pair of piston halves to accept a cylindrical magnetic reference element 404B. In this case, the reference element 404B has a magnetic north pole at one end of the cylindrical form and a south pole at the other. The reference element 404B may be formed with a center opening 428. Alternatively, the cylindrical magnetic reference element 404B may be formed without a center opening. If the cylindrical magnetic reference element 404B is formed having a center opening 428, it should be appreciated that the bore of the piston 193B may be formed as a fully open bore, or may be formed as a cylindrical annular groove that retains a center core, with the reference element slidingly fitted therein. Similarly, if the bore 426 of piston 193B is fully open and the cylindrical magnetic reference element 404B has a center opening 428, then the opening may be left open, filled with a separate core piece, or filled with an appropriate potting material. Regardless, when the reference element 404B is fitted into the end of the actuator piston 193B a cover plate 430 must be fitted and sealed to provide closed end that will be acted upon by the supplied hydraulic pressure to move the actuator piston 193B in the actuator bore 346.

As shown, the reference element 404B presents a north and a south pole at opposite ends of the half of the actuator piston 193B. This allows the detecting element 402 to sense the lateral movement of the actuator piston 193B in the piston bore 346, which is directly indicative of the position the associated transmission synchronizer 24. Furthermore, since the cylindrical magnetic reference element 404B disposed within actuator piston 193B provides magnetic poles fully around each end of the actuator piston half, the piston 193B does not have to be held in a particular longitudinal orientation. Thus, it is not necessary to use a flat on the shaft 376 of the piston as illustrated in regard to FIGS. 8A through 9B. It should be appreciated that the structure and relative operation of each of the other shift actuator pistons 195B, 197B, and 199B (not shown) is the same as described with respect to piston 193B. In this manner, the other detecting elements mounted to the central raised portion 332 likewise detect the movement of the their respective transmission synchronizers as well.

Figure 11A:
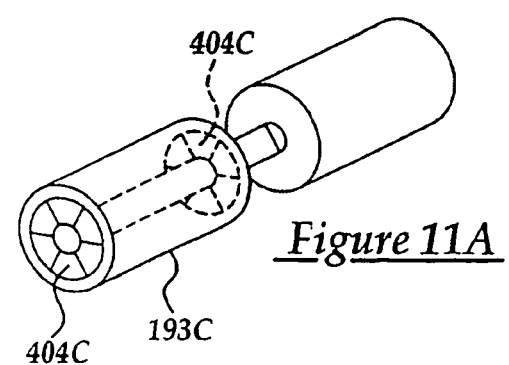
FIG. 11A is a perspective view of another shift actuator piston including one of the pairs of the reference elements of the integrated sensor assembly.
Figure 11B:
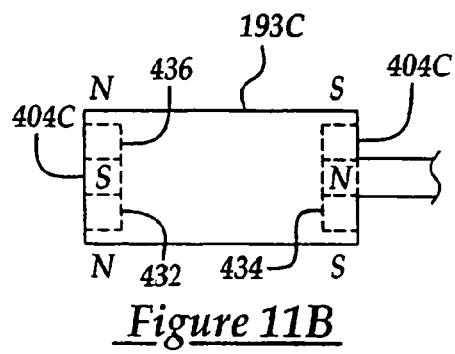
FIG. 11B is a partial cross-sectional view of the one of the shift actuator piston of FIG. 11A.
Figure 13A:
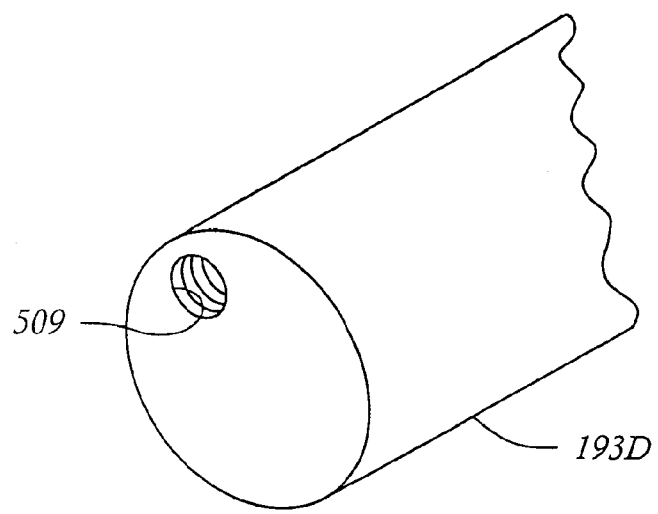
FIG. 13A is a partial perspective view of a piston body with a bore which accommodates a target assembly according to the present invention.
Figure 13B:
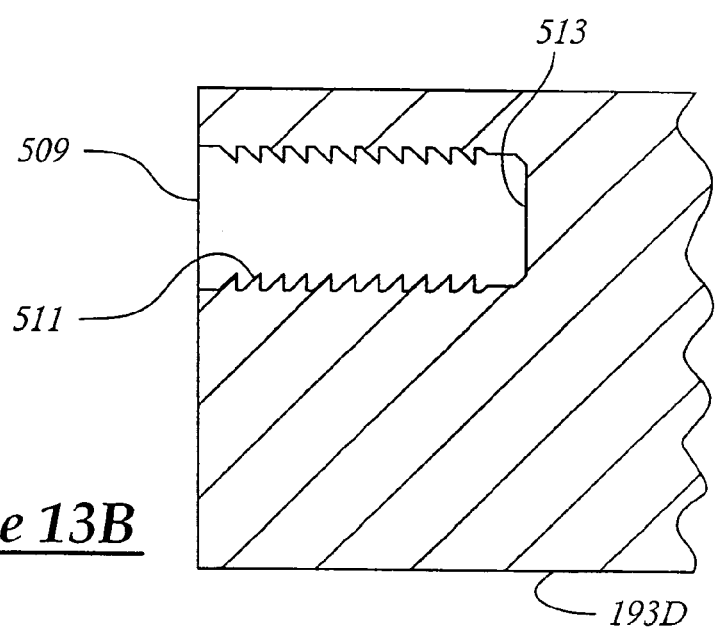
FIG. 13B is a side sectional view of the piston body shown in FIG. 13A.
Figure 13C:
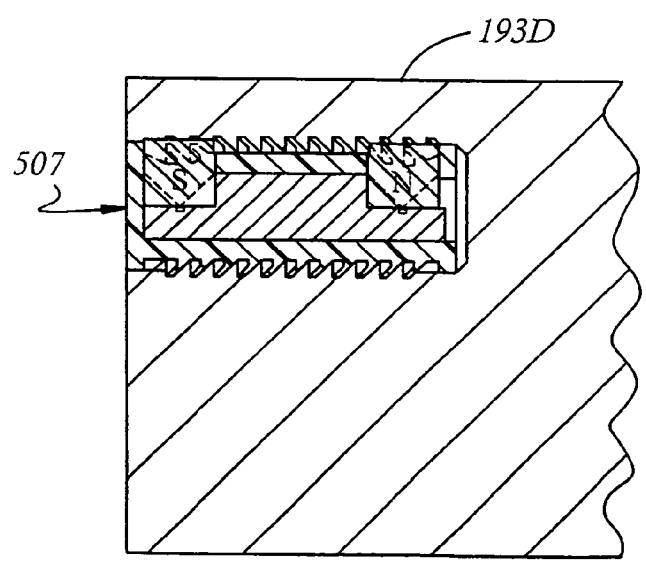
FIG. 13C is a view similar to that of FIG. 13B of a side sectional view of a sensor target assembly according to the present invention being installed within the piston body.

FIGS. 11A and 11B illustrate another approach to mounting a reference element in the piston 193C. As shown in the figures, a pair of annular shaped magnetic reference elements 404C are fixedly mounted in recessed annular bores 432 and 434 formed in the respective ends of one half of the actuator piston 193C. The reference elements 404C are generally ring shaped and have opposite magnetic pole configurations from their inside diameters to their outside diameters. As shown, one reference element has a north pole magnetically set on its outer diameter with a south pole magnetically set at its inner diameter. The other reference element has the opposite magnetic orientation. In this manner, the reference elements 404C present a north and a south pole at opposite ends of the half of the actuator piston 193C.

It should be appreciated that the reference elements 404C may also be formed as a series of wedge shaped magnetic pieces, or a series of generally cubed magnets (similar to reference elements 404A, in FIGS. 8A and 8B) and disposed in the recessed annular bores 432 and 434. Similar to FIGS. 10A and 10B, a cover plate 436 may be employed to seal the reference element(s) 404C to provide a closed end that will be acted upon by the supplied hydraulic pressure to move the actuator piston 193C in the actuator bore 346.

In addition to monitoring of the shift actuator positions, the control of the dual clutch transmission requires the monitoring the rotational speed of the two input shafts 14 and 16 (FIG. 1A) during operation. Thus, the integrated control module includes input shaft speed sensors. In the preferred embodiment, the input shaft speed sensors are illustrated in FIGS. 4 and 5 at 450 and 452. The input shaft speed sensors 450, 452 are mounted to the transmission control assembly 88 and extend outward toward their respective input shafts when the control module 310 is installed into the transmission case.

In this way, the module 310 provides integration of the various components necessary to provide all operative control and support of the functions of the dual clutch transmission and includes shift actuator position sensing that has its sensing elements well removed from the close proximity to, and harsh environment of the shafts and synchronizers of the conventional sensing systems. Thus, integrated transmission control module has an integrated shift actuator position sensor assembly including detecting elements 402 disposed on the central raised portion 332 of the valve body 312 that provide sensing of the movements of the shift actuator pistons and thereby allow for a determination of the transmission synchronizer movements and position.

Referring to FIGS. 12A-13C, a sensor target assembly 507 of the present invention is provided. The sensor target assembly 507 is mounted within a piston 193D. The piston 193D has a generally axial bore 509. Axial bore 509 is typically eccentrically positioned with respect to an axial center line of the piston 193D. The axial bore 509 will typically have a surface finish preparation that can be provided by knurling or grooving. As shown, axial bore 509 has a helix groove provided by screw threading 511. Axial bore 509 typically has a blind end 513. Although not shown, piston 193D is connected to a shaft to a corresponding piston similar in a manner that shown for the pistons shown in FIGS. 8-11.

Inserted into the piston axial bore 509 is a positioning alignment cylinder 514. The positioning alignment cylinder 514 is typically fabricated from an oil tolerant polymeric material such as a glass filled nylon plastic material. The alignment positioning cylinder 514 has a generally closed end 518 and an open end 520. The cylinder 520 along its outer surface has a series of protrusions as shown provided by annular barbs 522. The barbs 522, which in a free state are, in any combination typically angled between 25 and 90 degrees with respect to the longitudinal axis of the cylinder 514. As shown, the barbs are angled at approximately 45 degrees. The barbs are angled radially outward in a direction opposite of the insertion direction of the sensor target assembly 507. The spacing between the barbs 522 is typically identical or close to the thread width of the threads 511 of the piston bore. In some applications, the barbs will be angled by deformation caused during installation. The cylinder 514 has a generally axial bore 524. The axial bore 524 in the example shown is intercepted by two radial openings or bores 526. In embodiments (not shown) the cylinder may be intercepted by a single or three or more radial openings dependent upon the design of the target. The radial bores 526 accept align and position adjacent the ends of the cylinder 514, the required magnets or ferritic bodies (as shown two spaced apart magnets of opposite polarity 528 and 529). A bottom portion of the axial bore 524 receives a flux bar 549 (as required). The flux bar 549 may have indentations to locate the magnets 528 and 582. When the cylinder 514 is insertable installed within the piston bore 509, the closed end 518 is positioned generally opposite the blind end 513 of the piston bore. The barbs 522 along their perimeter have three generally axial slots 536. In other embodiments (not shown) there may be fewer or additional slots. Since axial slots 536 are generally geometrically spaced, the barbs 522 are free to lock into separate portions of the helical groove 511 provided by the piston bore threads. Since the open end 520 is first inserted into the piston axial bore 509, the barbs 522 generally incline towards the open end of the axial bore in a direction generally opposite the direction of insertion. The cylinder 514 has two pilot ends 518 and 520 which generally are annular and set the desired eccentricity of the cylinder 514, thereby insuring that the cylinder 514 is in the correct desired position within the piston bore 511. The blind end 518 insures retention of the components of the target assembly. To aid in long term retention is desirable that the barbs 522 be thick enough that they have a memory to spring back after insertion so that the cylinder 514 is self-retaining within the bore 509 even under relatively high pull out forces. The memory function of the barbs 522 insure that the cylinder 514 is annularly expanding to insure a snug non-rotative positioning within the piston bore 509.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sensor target assembly for a body having an axial bore with a helical groove and a blind end, said sensor assembly comprising:
    a polymeric alignment positioning cylinder for insertion into said body bore, said cylinder having an axial bore intersected by two radial openings adjacent ends of said cylinder for accepting and aligning two spaced apart magnetic targets of opposite polarity, said cylinder having two annular pilot ends for setting an eccentricity of the cylinder within the body bore, said cylinder having a blind end for positioning opposite the bore blind end, and said cylinder bore being able to accomodate a flux bar with indentions to locate said magnets, and said cylinder having a blind end to ensure retention of components of the target assembly within said body axial bore and wherein said cylinder has annular barbs angled radially outward in a direction opposite of an insertion direction of said cylinder within said body bore and wherein spacing between said barbs is typically identical or close to a thread width of said helical groove within said body axial bore and wherein said barbs have axial slots along said barbs to allow said barbs to freely lock into separate portions of the body bore helical groove and wherein said barbs are thick enough such that said barbs have a memory to spring back after insertion so that said cylinder is self-retaining within the body bore and wherein said cylinder is annularly expanding to ensure a snug non-rotative positioning within the body bore.

2. A sensor assembly as described in claim 1 wherein said alignment positioning cylinder is fabricated from oil tolerant glass filled nylon.

3. A sensor target assembly as described in claim 1 wherein said body is a piston.

4. An alignment positioning cylinder for a sensor target assembly for a body with a bore having a helical groove and a blind end, said alignment positioning cylinder comprising:
    a polymeric alignment positioning cylinder for insertion into said body bore, said cylinder having an axial bore intersected by two radial openings adjacent ends of said cylinder for accepting and aligning two spaced apart magnetic targets of opposite polarity, said cylinder having two annular pilot ends for setting an eccentricity of the cylinder within the body bore, said cylinder having a blind end for positioning opposite said bore blind end, and said cylinder accepting a flux bar with indentions to locate said magnets, and said cylinder having a blind end to ensure retention of components of the target assembly within said body axial bore and wherein said cylinder has annular barbs angled radially outward in a direction opposite of an insertion direction of said cylinder within said body bore and wherein spacing between said barbs is typically identical or close to a thread width of said helical groove within said body axial bore and wherein said barbs have axial slots along said barbs to allow said barbs to freely lock into separate portions of said body bore helical groove and wherein said barbs are thick enough such that said barbs have a memory to spring back after insertion so that said cylinder is self-retaining within said body bore and wherein said cylinder is annularly expanding to ensure a snug non-rotative positioning within said body bore.

5. An alignment positioning cylinder as described in claim 4 wherein said cylinder is fabricated from a glass filled plastic material.

* * * * *